April 1, 1952 G. C. AUSTIN 2,591,115
TOOLHOLDER
Filed Sept. 9, 1946
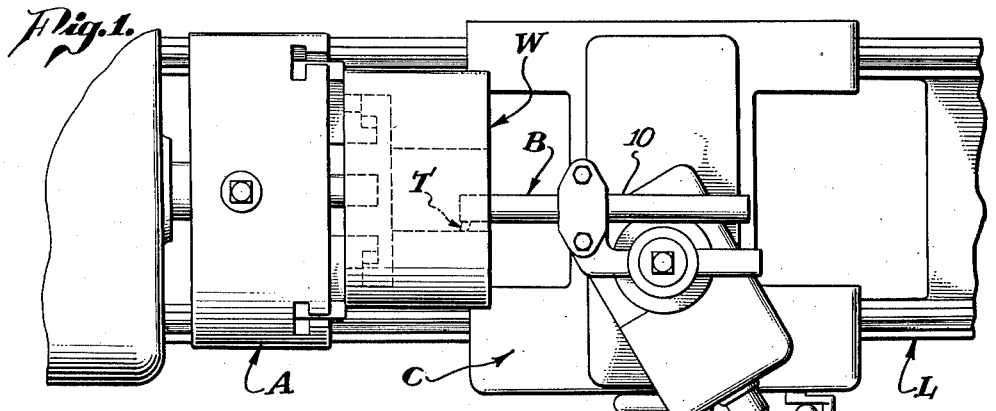
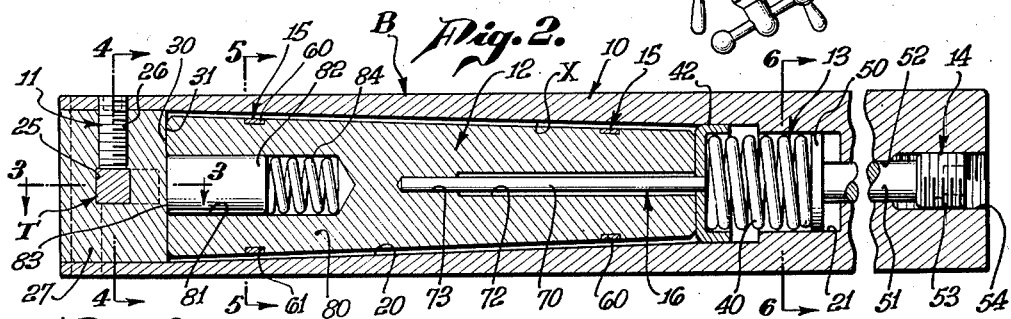
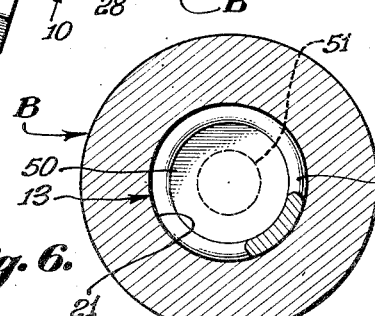
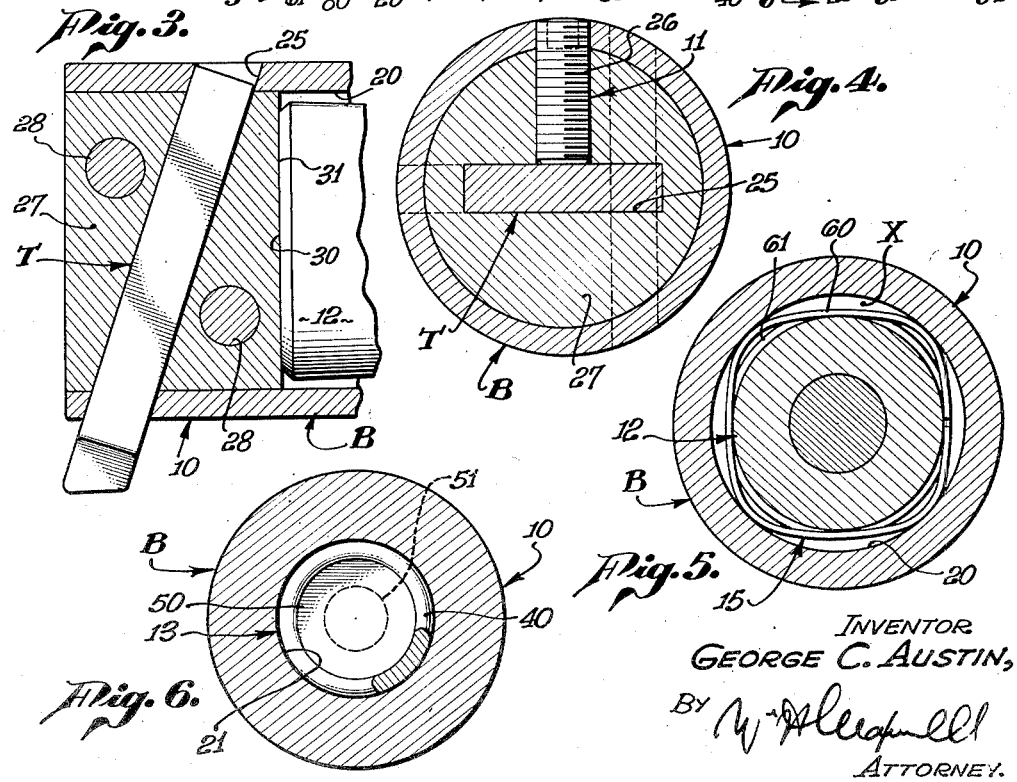
INVENTOR
GEORGE C. AUSTIN,
BY
ATTORNEY.

Patented Apr. 1, 1952

2,591,115

UNITED STATES PATENT OFFICE 2,591,115

TOOLHOLDER

George C. Austin, Los Angeles, Calif.

Application September 9, 1946, Serial No. 695,731

8 Claims. (Cl. 29—96)

This invention has to do with a holder for cutting tools and it is a general object of the present invention to provide a simplified, improved, practical construction for holders such as are employed to carry or hold cutters or cutting tools employed in machine work, generally.

Cutting devices or tools of various forms are employed in machine work and it is common that such devices be held in holders which, in turn, are carried by rests or carriages so that the tools are properly presented to the work. For example, in the case of ordinary lathe work, cutting tools are commonly carried in devices known as tool holders or boring bars, which devices are essentially the same, except that they vary somewhat in form and in their application to work. For example, tool holders are ordinarily employed when cuts are being made on the exterior of the work whereas boring bars are employed when cuts are made at the interior of the work.

It is well known to those familiar with cutting tools and the various holders employed to carry them that under many working conditions vibrations are set up and it is not uncommon for such vibrations to become violent and of such character as to cause what is commonly referred to as chatter. Such undesirable vibration or chatter occurs, generally, in tool holders. However, it occurs most commonly in boring bars in that such devices are usually long, slender elements, more readily vibrated than the ordinary lathe tool holder.

My present invention is concerned, primarily, with the dampening of vibrations in tool holders or in devices employed for holding cutting tools, and I contemplate that the broader principles of my invention may be used in various forms or types of holders. Since boring bars are most subject to vibration or chatter I have illustrated the invention as applied to this particular type of holder. When I use the term boring bar I contemplate, however, that the structure thus defined need not be specifically in the nature of a bar but may be any suitable form or type of tool holder.

A general object of the present invention is to provide a cutting tool holder having a vibration damper applied thereto or incorporated therein so that the holder remains steady under operating conditions and is not subject to vibration or chatter.

A further object of the present invention is to provide a holder of the general character above referred to which has a damper embodied therein so that it is protected against injury and so that it does not materially change the form or character of the holder either as to size or general construction. An important feature of my invention is the fact that the damper may be incorporated in a boring bar so that the bar is of limited size or diameter and is free of projections or parts that might otherwise interfere with its normal use as a boring bar.

A further object of the present invention is to provide a holder of the general character referred to which includes a damper which checks vibration and which is adjustable to act effectively under varying working conditions.

A further object of the present invention is to provide a holder of the general character referred to including a block which forms a damper and which has limited bearing engagement with the holder proper, and which is effectively and dependably supported in proper working position relative to the holder.

It is another object of the present invention to provide a holder of the general character referred to having a dampening block which is sectional in form. By providing a dampening block in sections I greatly increase the dampening action of the block as the sections are related to act independently, to the extent that if one section tends to vibrate the other acts to dampen it.

The various objects and features of my invention will be fully understood from the following detailed description of a typical preferred form and application of the invention, throughout which description reference is made to the accompanying drawings, in which:

Fig. 1 is a plan view of a lathe showing a boring bar embodying the present invention, being employed on work in the lathe. Fig. 2 is a longitudinal detailed sectional view of the boring bar. Fig. 3 is an enlarged sectional view taken as indicated by line 3—3 on Fig. 2. Fig. 4 is an enlarged transverse sectional view taken as indicated by line 4—4 on Fig. 2. Fig. 5 is an enlarged transverse sectional view taken as indicated by line 5—5 on Fig. 2, and Fig. 6 is an enlarged transverse sectional view taken as indicated by line 6—6 on Fig. 2.

The present invention, being illustrated as applied to a typical or common type of boring bar such as is used in a lathe or like machine, I have, in the drawings, shown the bar B supported by the carriage C of a lathe L so that it enters a unit of work W supported by a chuck A. The bar B is shown carrying a cutting tool T so that it acts on the wall of a bore provided in the work W.

The holder that I have provided involves, generally, an elongate body 10 shown in the drawings as a bar and designated as element B in Fig. 1 of the drawings. I provide means 11 at a suitable part of the holder, preferably at the outer end portion of the bar, to carry a cutting tool T. Further, my invention provides dampening means which serves or acts to check vibration or chattering of the bar and which involves, primarily, a dampening block 12 having limited engagement with the body 10 and means 13 normally yieldingly holding the block in pressure engagement with the body. Most specifically, the dampening means includes adjusting means 14 operable to vary the pressure with which the block is held in engagement with the body and suitable mounting means by which the block is properly held relative to the body. In the particular case illustrated the mounting means for the block involves two structures, either one or both of which may be employed, one structure including one or more mounting rings 15 between the block and the body and the other including a mounting stem 16 supported from the body and holding or carrying the block.

The body 10, when in the form of a boring bar, as shown in the drawings, is an elongate member preferably round or turned, as is the ordinary boring bar. The body is preferably formed of steel such as is used in the ordinary boring bar. The bar that I provide may correspond, generally, in size and shape with an ordinary boring bar, that is, by incorporating the structure of the present invention it is unnecessary to materially alter or add to the size of the bar since I prefer to incorporate the structure that I provide within the bar, and I do this without materially weakening the bar.

In accordance with the broader principles of my invention the block of the dampening means may be related to the body 10 in various ways. However, I prefer as illustrated in the drawings, to enclose the block entirely within the body and I further prefer to enclose the means 13 as well as the means 14 entirely within the body.

The preferred form of body 10 has a central elongate chamber X formed in it to carry the block 12, and since it is preferred that the block 12 engage or bear upon the body at or close to the means 11 which carries the tool, the chamber X is formed in the end portion of the body where the means 11 is located. In the preferred construction which is illustrated in the drawings the chamber X is formed by a central tapered bore 20 which extends into the body 10 from its outer end portion far enough to adequately accommodate the block 12. A socket 21 is formed in the body at the inner end of the chamber X formed by the bore 20, which socket accommodates or carries the means 13 and may be a bore continuing from the inner end of the tapered bore 20. The tapered bore 20 forming the chamber X is made considerably larger in diameter at its outer end or adjacent the outer end portion of the body than at its inner end where it joins or is in communication with the socket 21 so that the wall thickness of the body 10 surrounding the block 12 tapers or varies in thickness providing a chamber X of maximum size without materially weakening the end portion of the body in which the block is located.

The means 11 provided to carry a tool T or the like may be any suitable structure provided at the desired point along the body 10 to adequately hold or accommodate the tool. Since I am illustrating a typical boring bar I have shown the means 11 located at the outer or forward end of the body 10 and since I have shown the holder in a simple form provided for handling an ordinary cutting tool T, I have shown the means 11 as involving a tool carrying opening or passage 25 in the outer end portion of the body and a retainer 26 for holding a tool in the opening.

Where the body is formed with a bore 20 which enters it from its outer end and where the means 11 is located at the outer end of the body I prefer to make the body sectional by providing a plug section 27 which is fitted tightly into the outer end portion of the bore and is retained therein by suitable means such as lock pins 28 or the like. With the plug 27 fitted tightly into the bore and made fast by the retaining means its becomes, in effect, a solid or rigid part with the main portion of the body in which the bore is formed.

The tool carrying opening may extend diametrically through the outer end portion of the bar in the manner common to boring bar construction and it may, as I have shown, be pitched or angularly disposed so that the tool T is supported by the bar in the most advantageous manner.

The retainer 26 is preferably a set screw threaded to the outer end portion of the body 10 with its outer end accessible so that it can be operated and with its inner end located to engage and clamp the tool T arranged in the opening 25.

The block 12 of the dampening means is a body or structure of material having a high specific gravity and it is so related to the body 10 as to have limited bearing engagement with the body at or near the means 11. In the case illustrated the block 12 is confined in the chamber X and is an elongate body turned or round in cross section so that it fits the bore 20 with clearance, as illustrated in Fig. 2 of the drawings. The block 12 is supported by the means 15 and 16 as will be hereinafter described, so that it has bearing engagement with the body 10 only at the forward end portion of the body. In the case illustrated the forward end 30 of the block 12 is shaped or finished so that it is a bearing face having direct bearing contact with the inner end 31 of the plug section 27 of the body. In practice the faces 30 and 31, which are engaged as just described, may be flat, smooth faces, as I have shown throughout the drawings.

The means 13 that acts to normally yieldingly hold the block 12 in pressure engagement with the body 10 is preferably a spring and in the case illustrated the spring is shown carried in the socket 21 provided at the inner end of the bore 20 which forms the chamber X. I have shown a helical spring 40 carried in the socket 21 and under compression so that it acts to urge the block 12 forward and thus causes the forward end of the block to have pressure engagement with the inner end of the body section 27. In the particular case illustrated a follower 42 is arranged between the spring 40 and the block 12 and is slidably guided in a part of the socket 21 finished to perform this function.

The means 14 provided for effecting adjustment of the means 13 may be any suitable structure or arrangement of parts whereby the action of the spring 14 may be varied. In the case illustrated I show a head 50 in the socket 21 supporting the spring 40 and a shank 51 extends from the head 50 through a central passage 52 provided in the body 10 to the inner end portion of the body where an adjustable plug 53 supports the shank. The plug 53 may be a simple plug threaded into a bore 54 at the inner end of the body. By varying or adjusting the plug 53 the shank 51 is adjusted lengthwise of the body causing corresponding adjustment of the head 50 in the socket 21. By adjusting the plug 53 so that the head 50 is moved toward the block 12 the spring 40 is compressed, thus increasing the pressure with which the block 12 is held against the inner end 31 of the plug section 27 of body 10.

The means 15 that I have shown mounting the block 12 in the body 10 involves a plurality of simple, crimped or corrugated spring rings 60 spaced lengthwise of the block 12 and carried in grooves 61 in the block having inner portions seated in the groove 61 and outer portions bearing on the wall of the bore 20. The rings 60 are like spring rings which serve merely to centralize or properly space the block 12 in the body 10 without forming couplings or vibration transmitting connections between the body and block.

The means 16 which I have illustrated includes a central stem 70 suitably supported from the body 10 and preferably engaging the block 12 at a point intermediate its ends to support it centrally in the body 10. In accordance with the broader principles of my invention the stem 70 which may be a light, somewhat flexible rod, may be supported from the body 10 in any suitable manner. In the case illustrated I have shown it projecting from the follower 42 which is guided in the socket 21 formed in the body 10. The stem projects from the follower 42 through a central passage 72 formed in the block 12 from its inner end. The passage 72 continues in the block to a point about midway between the ends of the block where it terminates at a bore 73 which tightly receives the end portion of the stem 70. Through the construction just described the stem 70 supported from the body 10 projects freely into the block 12 to engage and support the block at a point about midway between its ends and it thus serves to yieldingly support the block in a central position in the body.

In accordance with my invention the block 12 may be a single integral or solid body of material and it is preferably a material of high specific gravity. In practice I have employed dense materials or compounds such as lead or compounds of tungsten and silver, it being understood that I may employ any suitable material in the formation of the block and it will be apparent that is advantageous that the material be as dense as possible.

In the particular form of the invention illustrated the block 12 instead of being a single unitary block or body of material such as I have described is of sectional construction. The particular structure shown involves a main block section 80 having a central bore 81 entering it from its forward end to slidably carry a secondary section 82. The secondary section of the block has its forward end 83 finished to bear on the inner side 31 of the plug section of the body and a compression spring 84 is arranged between the other or inner end of the section 82 and the bottom of the bore 81 so that the section 82 is normally yieldingly held in pressure engagement with the face 31. In practice I have found it practical to fit the secondary section 82 of the block 12 in the bore 81 leaving a clearance of about .002 of an inch.

From the foregoing description it will be apparent that the holder which I have provided, being formed as a boring bar, can be used in a lathe, or the like, in the manner that an ordinary boring bar is used. When the structure is in use a tool T is mounted or set in the means 11 and the block 12 is mounted or guided within the body 10 to have bearing engagement with the body only at or adjacent the means 11. As above pointed out I may, in practice, employ either the means 15 or the means 16, or both of these means in mounting the block 12 in the body. The spring 84 being under compression normally yieldingly holds the secondary section of the block in pressure engagement with the face 31 of the body and the means 14 is adjusted so that the spring 40 acts to hold the main or primary section of the block 12 in engagement with the face 31 with the desired pressure.

As the structure is in use and the tool T is operating or cutting there will be a tendency for the body 10 to vibrate just as there is a tendency for an ordinary boring bar to vibrate. In the case of an ordinary boring bar there is nothing to check or dampen the vibratory action. However, with my construction the block 12 which is a dampening mass bearing on the body 10 at or close to the point where the tool is held serves to effectively check or dampen vibration. Since the structure involves two primary parts, that is, the body 10 and the block 12, in pressure engagement with each other, and having different vibratory characteristics, the structure will only vibrate if conditions are such as to cause both of these elements to vibrate simultaneously. The block 12 may alone effectively dampen the body 10, however, if it does not, the secondary section 82 of the block comes into play or serves to dampen the vibration to the end that the structure is, for practical purposes, entirely free of vibration under all working conditions.

The action of the structure may be described as follows: Assuming that the spring 40 exerts about six pounds pressure on the small end of block 12 the block is pressed tight against the plug section 27. A force of forces may set the bar slightly in motion so the block 12 is carried with the bar, that is, the frictional engagement of the block with plug section 27 causes the block to ride with the bar. When the movement of the bar becomes more violent or pronounced, and before it approaches a condition to be undesirable, there is a break or slippage between the block and plug section so there is sliding engagement between these parts under which condition the block acts as a break or dampening element. When the block has a secondary section 82 carried in the main part with slight clearance, say a clearance of about .002 of an inch and the secondary section is held against the plug section by a spring pressure of about three pounds the block 12 starts to slip before great force develops in the bar and when the block moves only a slight amount relative to the plug section the secondary section is picked up with a jarring action so the secondary section moves relative to the plug section and effectively exerts a vibration dampening action. By the combined action of the two parts of the block, movements or oscillations of the bar of very low magnitude are effectively checked or dampened.

Having described only a typical form and application of the invention, I do not wish to be limited or restricted to the specific details herein set forth, but wish to reserve to myself any variations or modifications that may appear to those skilled in the art and fall within the scope of the following claims.

Having described my invention, I claim:

1. A tool holder of the character described including an elongated metallic body, tool holding means carried by the body, and vibration damping means carried by the body including, a block movable relative to the body and bearing on the body adjacent the tool holding means, and a spring normally holding the block in pressure engagement with the body, the block including a main metallic section bearing directly on the body and a secondary metallic section of less mass than the main section carried by the main section and movable relative thereto.

2. A tool holder of the character described including an elongate body, tool holding means carried by the body, a vibration dampening block, means mounting the block to have bearing engagement with the body at the tool holding means and so it is free to move relative to the body, and a spring acting between the body and block yieldingly holding the block in pressure engagement with the body, the block including a main section bearing directly on the body and a secondary section of less mass than the main section and carried by the main section and bearing directly on the body, the secondary section being free to move relative to the main section.

3. A tool holder of the character described including an elongate metal body having a main section with a bore extending into it from one end and a plug section tight in the bore and closing the outer end of the bore, there being a tool holding opening through the body and plug, a vibration dampening block loosely fitted in to have the block being metal and being in direct bearing engagement with said plug, and a spring acting between the body and block yieldingly holding the block in pressure engagement with the plug.

4. A tool holder of the character described including an elongate body having a main section with an inwardly convergent bore extending into it from one end and a plug section tight in and closing the outer end of the bore, there being a tool holding opening in the plugged end portion of the body, an elongate vibration dampening block fitted freely in the bore, and a spring acting between the body and block yieldingly holding the block in pressure engagement with the plug section, the block being tapered throughout a substantial portion of its length.

5. A tool holder of the character described including an elongate body having a tool carrying portion and an opening extending therefrom, a vibration dampening block freely carried in said opening in bearing engagement with said portion of the body, a spring acting between the body and block yieldingly holding the block in pressure engagement with said portion of the body, the block having a main section with a face bearing on the block, there being a socket in said face, and a secondary section smaller than the main section freely carried in the socket and bearing on said portion of the body.

6. A tool holder of the character described including an elongate body having a main section with a bore extending into it from one end and a plug section closing the outer end of the bore, tool holding means carried by the body, a vibration dampening block having a socket in it from one end, means mounting the block in the bore to have bearing engagement with the plug section, a spring acting between the body and block yieldingly holding the block in pressure engagement with the plug section, and means mounting the block in the chamber free of the main section of the body including a stem carried by the body extending freely into said socket and engaging the block at the bottom of the socket.

7. A tool holder of the character described including an elongate body having a main section with a convergent bore extending into it from one end and a plug section tight in and closing the outer end of the bore, tool holding means carried by the body, a vibration dampening block, means mounting the block in the bore free of the body and in direct bearing engagement with the plug section, and a spring acting between the body and block yieldingly holding the block in pressure engagement with the plug section, the dampening block including a main section with a face bearing on the plug section and having a socket in said face and a secondary section smaller than the main section and freely carried in said socket in bearing engagement with the plug section.

8. A tool holder of the character described including an elongate body having a tool carrying portion and an opening extending therefrom, a vibration dampening block freely carried in said opening in bearing engagement with said portion of the body, a spring acting between the body and block yieldingly holding the block in pressure engagement with said portion of the body, the block having a main section with a face bearing on the block, there being a socket in said face, a secondary section smaller than the main section freely carried in the socket and bearing on said portion of the body, and a spring in said socket under compression between the secondary section and the main section yieldingly holding the secondary section in bearing engagement with the said portion of the body.

GEORGE C. AUSTIN.

REFERENCES CITED

The following references are of record in the file of this patent:

UNITED STATES PATENTS

| Number | Name | Date |
|---|---|---|
| 2,051,954 | Leland | Aug. 25, 1936 |
| 2,187,772 | Dally | Jan. 23, 1940 |
| 2,189,604 | Healy | Feb. 6, 1940 |
| 2,426,359 | Lankheet | Aug. 26, 1947 |

FOREIGN PATENTS

| Number | Country | Date |
|---|---|---|
| 26,847 | Great Britain | Dec. 5, 1902 |